United States Patent [19]

Backenköhler

[11] 4,139,269

[45] Feb. 13, 1979

[54] MIRROR WITH RIM IN GROOVE MOUNTING

[76] Inventor: Willi Backenköhler, Hunoldstrasse 5, Wardenburg-Hundsmühlen, Fed. Rep. of Germany

[21] Appl. No.: 846,214

[22] Filed: Oct. 27, 1977

[30] Foreign Application Priority Data

Oct. 29, 1976 [DE] Fed. Rep. of Germany ....... 7634148
Oct. 29, 1976 [DE] Fed. Rep. of Germany ....... 7634149
Jun. 13, 1977 [DE] Fed. Rep. of Germany ....... 2726543

[51] Int. Cl.² .......................... G02B 5/12; G02B 7/18
[52] U.S. Cl. ..................................... 350/293; 350/307
[58] Field of Search ............... 350/293, 303, 304, 307, 350/67, 320, 288; 248/473, 468

[56] References Cited

U.S. PATENT DOCUMENTS 3,377,177   4/1968   Biscow ................................. 350/307
3,802,766   4/1974   Magi .................................... 350/288

FOREIGN PATENT DOCUMENTS 1099860   1/1968   United Kingdom ..................... 350/288

Primary Examiner—Jon W. Henry
Attorney, Agent, or Firm—Max Fogiel

[57] ABSTRACT

An accessory arrangement for an inside and an outside mirror includes a two-part hollow member with one part being a spherical mirror section. A peripheral shoulder on one part snaps into a peripheral groove on the other part.

10 Claims, 3 Drawing Figures

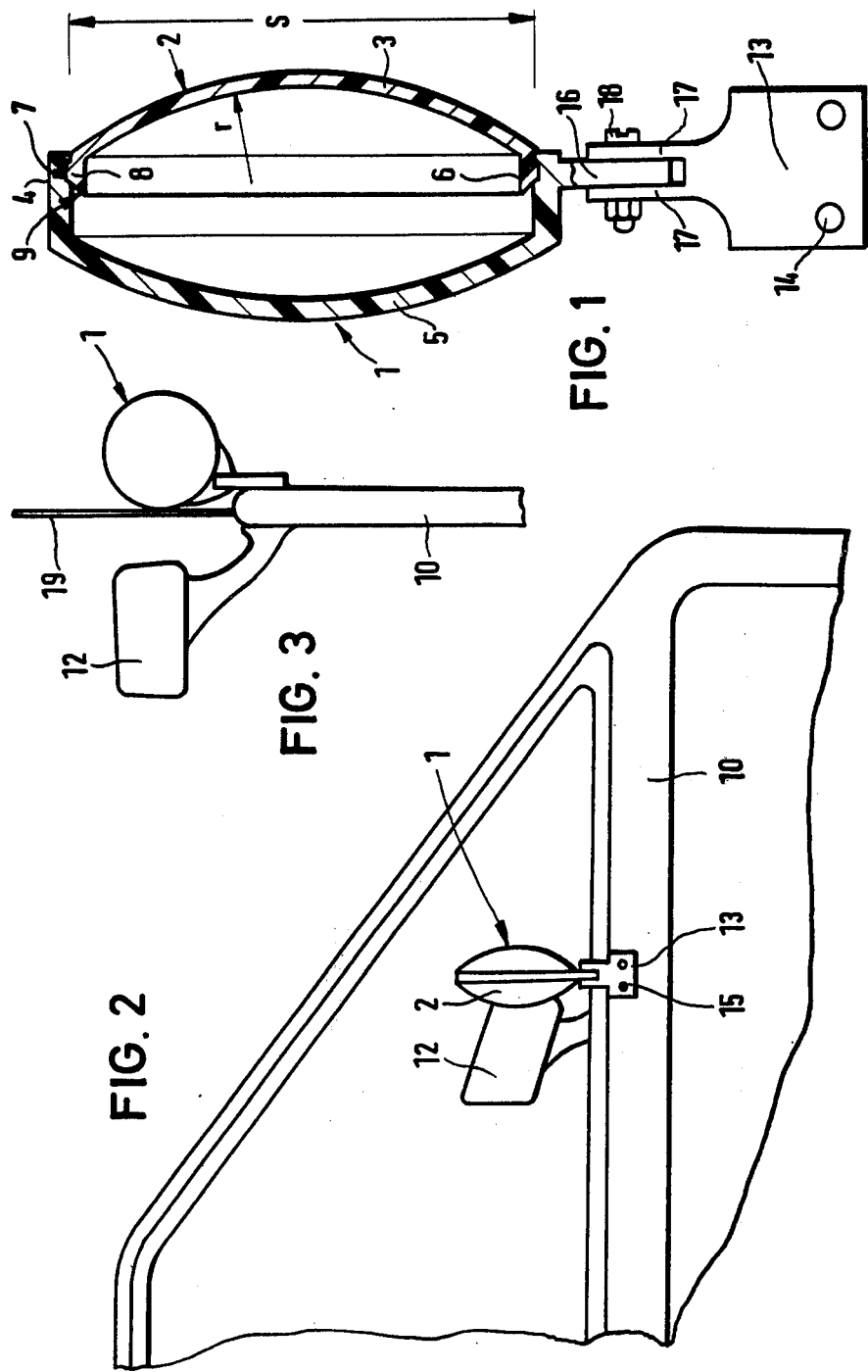

MIRROR WITH RIM IN GROOVE MOUNTING

The present invention relates to a safety device for rearview mirrors, particularly for motorized vehicles.

The rear-view mirrors of a motorized vehicle normally consist of an outside and inside mirror, each of which has plain mirror surfaces. In spite of such double mirror arrangement it is well known that there is a socalled blind spot which lies diagonally rear of the driver and cannot be seen in the inside or outside mirror without the driver having to look round. However, to do so involves the danger of driving blindly in the direction of travel. In the past, one therefore attempted to increase the rear-view by socalled panorama mirrors. One was unable, however, to eliminate the blind spot. It has also been suggested to equip the outside mirror with 2 mirror surfaces angled at more than 180° to each other in order to create a wide angle arrangement. These types of arrangements did not prove successful because 2 different images are reflected in the two mirror surfaces which must lead to rapid fatigue and is of constant irritation particularly when changing direction. An attempt has been made to eliminate these disadvantages by using small wide angle mirrors which can be mounted upon or in the outside mirror. The much reduced mirror surface (probably on account of wind resistance, etc.) produces merely a small image which is very difficult to resolve clearly and which demands an intensive and concentrated observation for a long time and can lead to a dangerous distraction of the driver's attention from the normal traffic conditions not to mention the resulting fatigue. The disadvantages listed may well be the reason for the known arrangements practically not having found any importance worth mentioning.

Leading from this it is the purpose of this invention in avoiding the disadvantages of the known arrangements to provide a safety arrangement for a rear-view mirror, particularly for motorized vehicles, which invention provides not only a view in the region of the socalled blind spot without the driver having to look round, but also provides an easily to be resolved image of this region preventing fatigue and irritation of the driver and offering simultaneously the possibility of a simple and economical production and assembly.

The purpose of this invention is solved in a surprisingly simple way with at least one mirror surface in the field of view of the vehicle's side windows having a mirror surface of uniform convex curvature and the size of a standard rearview mirror. The convex curvature yields an excellent broad field of view so that by situating it in the field of view of the side windows the region of the blind spot is completely covered. Nevertheless, it is beneficial that as a result of the chosen size and in spite of the mentioned curvature no significant distortion is to be feared, rather a well resolved image can be quickly registered without fatigue. In this respect, a mirror with a radius of curvature in the range of 60 to 110 mm, preferentially 90 mm, and a width of at least 80 mm, preferentially 85 mm, has been shown to be especially suitable. Experiments have shown that it is especially advantageous for the manufacture and assembly when the curved mirror surface has the form of a spherical section corresponding to the dimensions given. A benefit of this is that plain edges result. The substance of this invention has the advantage of guaranteeing a high road safety and nevertheless offers high driving convenience at a low cost.

A very practical and therefore recommended embodiment of the invention would be to extend the usual type of rear-view mirror consisting of an inside and an outside mirror by a mirror containing the curved mirror surface and having a housing which can be attached to the inside of the vehicle opposite the outside rear-view mirror. This safety device is preferably installed without altering the existing rear-view mirrors, involving very little cost and at the same time practically no difficulty for the driver in accustoming himself to the new rear-view mirror arrangement, which is absolutely necessary to road safety. The advantage of the mirror containing the curved mirror surface is that it can be mounted independently from the existing rear-view mirror and can be used selectively and avoids irritation when using the conventional rear-view mirror. The conventional rear-view mirrors can be plain, which is very desireable for estimating distances. In addition, the mirror of this invention being mounted inside the car avoids wind drag so that the mirror surface can be dimensioned to give an optimum image without regard to this. There is also no tendency for the mirror to get dirty or ice up. This type of mounting is especially suitable for vehicles with relatively flat vehicle walls, which is normally the case in passenger vehicles. A practical extension would be to mount such mirrors on both sides of the vehicle. For transport vehicles having a housing or platform jutting over the cab it can in some circumstances be of advantage to integrate the curved mirror surface in one or both of the rear-view mirrors.

A further improvement to the main object of this invention, is to manufacture the mirror containing the curved mirror surface in the form of a chromium-plated plastic injection moulding. This permits a rational mass production with adequate accuracy.

Further features and advantages of this invention are contained in the description of the following example of the embodiment of the invention together with the drawing and the claims.

BRIEF DESCRIPTION OF THE DRAWING

FIG. 1 shows the preferred design of the invention in cross section.

FIGS. 2 and 3 show an example of a convenient mounting arrangement for the design in FIG. 1.

DESCRIPTION OF THE PREFERRED EMBODIMENT

The vehicle safety mirror shown in FIG. 1 and designated with 1 in the drawing, when used as an auxiliary mirror to the conventional mirrors, in for example a passenger vehicle, renders the socalled blind spot present when using conventional rear-view mirrors visible. The mirror 1 has therefore a mirror surface with a uniform convex curvature, which due to its raised surface allows a wide field to be imaged and yields the blind spot visible. The extent of the mirror surface 2 is of the same order of magnitude as that of a conventional rear-view mirror and produces a mirror image that can be quickly and distinctly resolved.

In the embodiment shown the mirror surface 2 has the form of a spherical section. The span width s that is the diameter of the base of the section is hereby approx. 85 mm, which gives a very effective total surface area. Experiments have shown that a span width of the order of 80 mm is the lower limit. The radius of curvature, r, that is the spherical radius which is necessary for the enlargement of the angle of view, but which leads on the other hand to image destortion, should lie in a range of between 60 to 110 mm. A 90 mm radius, as in this embodiment, produces very good results. The spherical curvature of the mirror surface, 2, provides an extension of the field to be observed in all directions and fulfils therefore the purpose of the invention. A further advantage of employing a spherical section is the thereby resulting plain edge, which considerably simplifies mounting the same.

The mirror 1, as FIG. 1 shows, is better constructed as a two part shell structure consisting of the mirror surface 2 corresponding to the curved face 3, which is retained by its edge in a corresponding holder of a dish-shaped housing 5. In the embodiment shown the face 3 is provided with a holding flange 6 bent to the rear, which is pressed into the surrounding frame 4 of the housing 5. With a corresponding press fit or additional adhesive, etc adequate strength can be obtained. In the embodiment shown, a groove and tongue joint is provided to give an additional snap fit. The side edge forming the frame 4 of the housing 5 is provided with a circumferential groove 7 into which the preformed lip 8 on the flange of face 3 fits. The hereby necessary lip height or groove depth has been exaggerated in FIG. 1 for clarity. In reality an extremely shallow profile would suffice. To ease the introduction of the flange's free edge into the frame 4 it is chamfered as shown in FIG. 1, 9. In some circumstances it could also be of practical value to provide the lip 8 with a correspondingly chamfered edge and/or to round off the edges to be passed in the region of the frame 4.

It is preferred to manufacture both housing parts 3 and 5 as plastic injection mouldings, which provides on the one hand the necessary elasticity for the assembly and on the other hand the necessary accuracy. The mirror surface 2 can be formed by plating the face 3 of the raw body with a suitable mirror surface such as chromium or nickel, etc, which is easily accomplished electrolyticly. The housing 5 is preferably dyed using current vehicle colours.

The safety mirror 1 described in detail above is particularly suitable for mounting inside the vehicle as can be recognized in FIG. 2 and 3. In the embodiment shown, the mirror 1 is mounted on the inside of the lower window frame 10 of the vehicle door 11. Fitting it directly opposite the outside mirror has shown itself as the most suitable arrangement, which is conveniently to hand, easily observable, but nevertheless avoids confusion. The mirror 1 is fitted with a mounting flange 13 having the necessary holes 14 for suitable fixing screws 15. In the embodiment shown, as can be seen from FIG. 1, the housing is fitted by means of a hinge joint to the mounting flange 13. For this purpose the housing 5 has an integrally formed tongue 16 and the mounting flange 13 an integrally formed fork 17. The connection of the inserted tongue 16 to the fork 17 is best made using a threaded bolt 18, enabling the adjustment of the hinge joint forwards or backwards. The above-mentioned hinge joint permits a convenient means of adjusting the distance of the mirror 1 from the window 19.

The above describes a preferred embodiment of the invention, without constituting a restriction. There are a number of possibilities open to the expert to adapt the general idea of the invention to the conditions of an individual case. In many cases, it will, for example, prove expedient to fit the safety mirror described above on both sides of the vehicle. On the other hand, in the case of transport vehicles in which the structure/platform juts over the roof of the cab it can be of particular advantage to have an outside mounting preferably integrating the safety mirror in the conventional rear-view mirror.

What is claimed is:

1. An accessory arrangement for an inside mirror and an outside mirror with reflecting means having a plane mirror surface on motor vehicles, comprising: an outside mirror on a vehicle, a mirror unit fastened on the inside of the vehicle and opposite said outside mirror, said mirror unit displaying space outside of said vehicle through an adjacent window pane, said mirror unit comprising a two-part hollow member having a housing with a peripheral mounting, said housing being covered by a wall formed as a spherical section projecting from said housing, said wall having a mirror surface corresponding in size to the size of a regular rearview mirror and having a rim bent backwards, said rim being chamfered at its free end, said rim having a radially projecting peripheral shoulder engaging a peripheral groove of said mounting of said housing.

2. An arrangement as defined in claim 1 wherein the area outside of the vehicle is visible to a driver of the vehicle without interference from a simultaneous view of the interior of the vehicle, estimating of the distance between said vehicle and another vehicle being possible from viewing said outside mirror and said mirror unit, said spherical section enlarging the outside area to be viewed and being operational substantially independent of position.

3. An arrangement as defined in claim 1 wherein said mirror surface has a curvature with radius of substantially 90 mm.

4. An arrangement as defined in claim 1 wherein said mirror surface has a curvature with span width of substantially 80 mm.

5. An arrangement as defined in claim 1 wherein said mirror unit with said mirror surface is located in region of both sides of the vehicle, said mirror surface being convex curved.

6. An arrangement as defined in claim 1 including hinge joint means and mounting plate means, said housing being fixed to said mounting plate means by said hinge joint means.

7. An arrangement as defined in claim 6 wherein said hinge joint means comprises an adjustable screw.

8. An arrangement as defined in claim 1 wherein said wall holding said mirror surface comprises a plastic injection molded member which is electrolytically plated.

9. An arrangement as defined in claim 2 wherein said housing and said wall are held together by snap-in closure free of projecting flanges.

10. An arrangement as defined in claim 1 wherein the area outside of the vehicle is visible to a driver of the vehicle without interference from a simultaneous view of the interior of the vehicle, estimating of the distance between said vehicle and another vehicle being possible from viewing said outside mirror and said mirror unit, said spherical section enlarging the outside area to be received and being operational substantially independent of position, said housing and said wall being held together by snap-in closure free of projecting flanges, said mirror surface having a curvature with radius of substantially 90 mm, said mirror surface having a span width of substantially 85 mm, said mirror unit being located in region of both sides of a vehicle, hinge joint means and mounting plate means, said housing being fixed to said mounting plate means by said hinge joint means, said hinge joint means comprising an adjustable screw, said wall comprising a plastic injection molded member, said mirror surface being an electrolytically plated surface, said housing having an integrally formed tongue portion, said mounting plate means having an integrally formed fork-shaped portion for receiving said tongue portion, said tongue portion and said fork-shaped portion being connected by said adjustable screw and being adjustable forwards and backwards for adjusting the distance of the mirror unit from the neighboring window of said vehicle.

* * * * *